UNITED STATES PATENT OFFICE.

ERNST FUSSENEGGER, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

YELLOW DYE AND PROCESS OF MAKING.

932,266.

Specification of Letters Patent. Patented Aug. 24, 1909.

No Drawing.

Application filed April 15, 1909. Serial No. 490,115.

*To all whom it may concern:*

Be it known that I, ERNST FUSSENEGGER, doctor of philosophy and chemist, subject of the Emperor of Austria-Hungary, residing at Ludwigshafen-on-the-Rhine, Germany, have invented new and useful Improvements in Yellow Dyes and Processes of Making the Same, of which the following is a specification.

I have discovered that by treating 3-chlor-6-nitranilin with formaldehyde, coloring matter can be obtained which is suitable for use as a pigment, or lake, the color being a beautiful yellow with a greenish tinge and being fast against the action of light, lime, water, and alcohol.

My new coloring matter possesses a composition corresponding to the formula

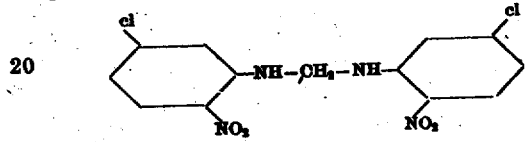

It is difficultly soluble in alcohol, easily soluble in hot xylene, and melts at about 210° C. The following example will serve to illustrate further the nature of this invention and how it can be carried into practical effect, but the invention is not confined to this example.

Heat together, in a closed vessel, at a temperature of from seventy, to eighty, degrees centigrade, and while stirring, three hundred and forty-five parts by weight of a ten per cent. paste of 3-chlor-6-nitranilin, and thirty parts by weight of a thirty per cent. formaldehyde solution. When, from a test portion, it is seen that no diazotizable base is present, the mixture is allowed to cool and the product is filtered off and washed.

Now what I claim is:

1. The process of producing coloring matter by treating 3-chlor-6-nitranilin with formaldehyde.

2. As a new article of manufacture, the coloring matter which can be obtained by treating 3-chlor-6-nitranilin with formaldehyde which coloring matter possesses a beautiful yellow color with a greenish tinge, is difficultly soluble in alcohol, easily soluble in hot xylene, melts at about 210° C., and possesses a composition corresponding to the hereinbefore defined formula $C_{13}H_{10}O_4N_4Cl_2$.

In testimony whereof I have hereunto set my hand in the presence of two subscribing witnesses.

ERNST FUSSENEGGER.

Witnesses:
J. ALEC LLOYD,
JOS. H. LEUTE.